Figure 1:
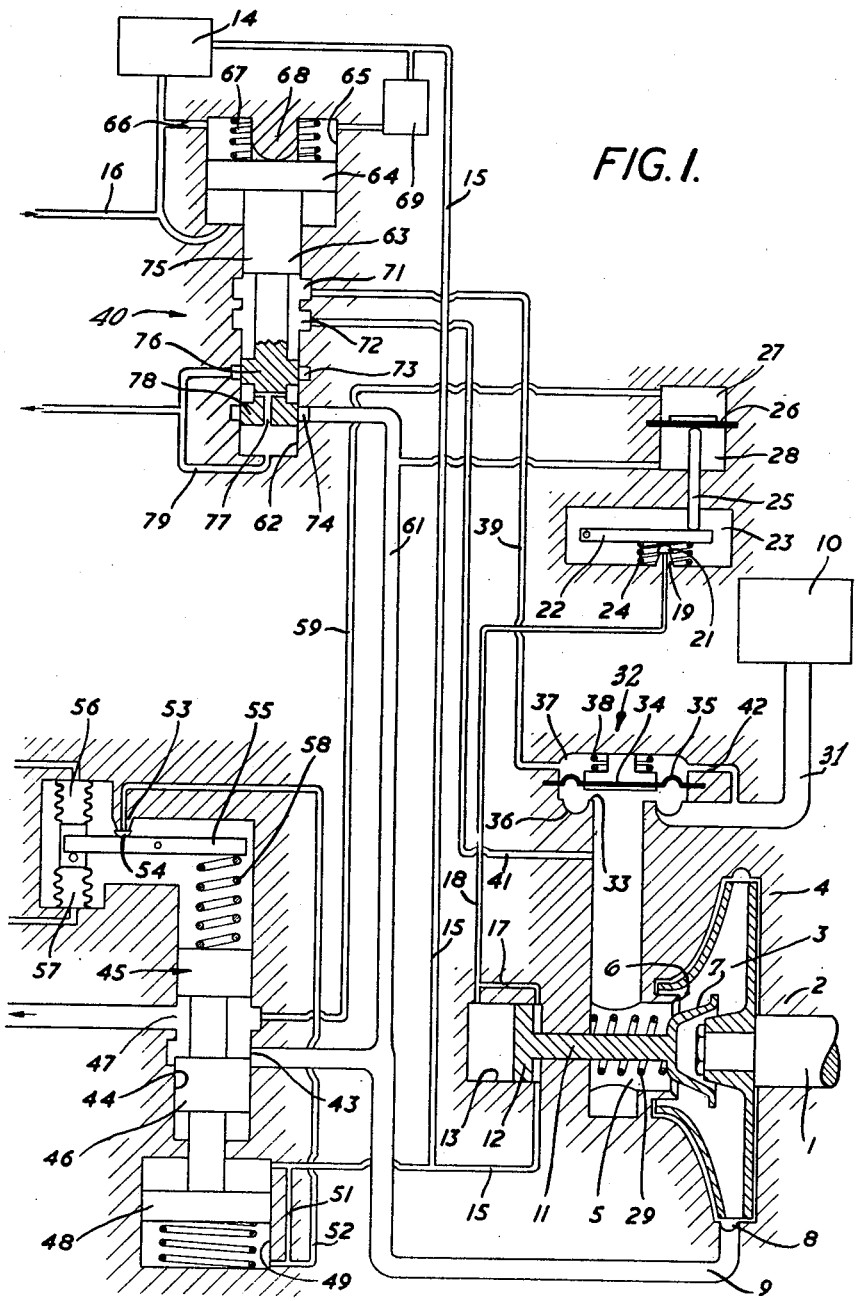

INVENTOR
STANLEY R. TYLER
BY Reynolds & Christensen
ATTORNEYS

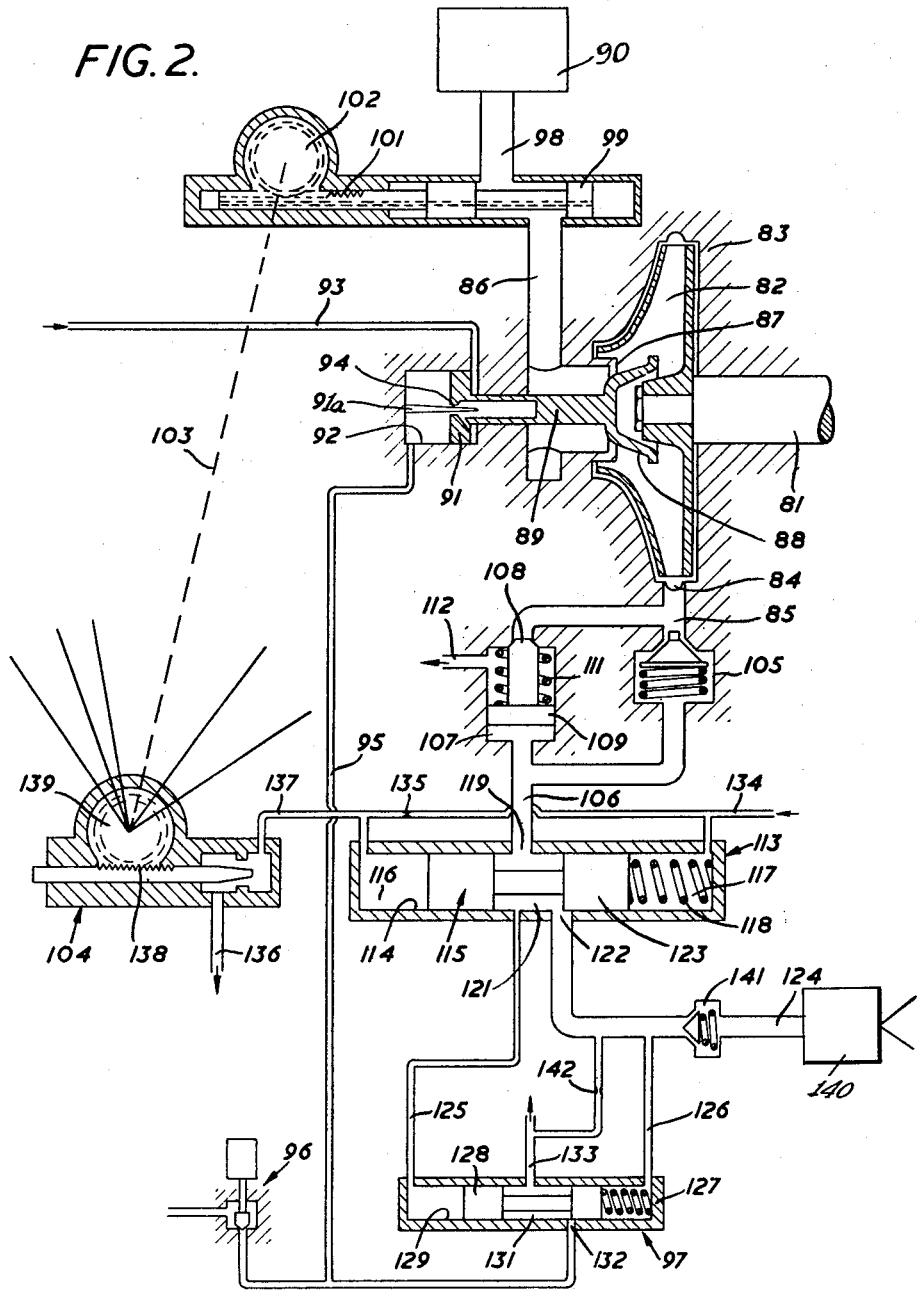

United States Patent Office 3,142,259
Patented July 28, 1964

3,142,259
LIQUID PRESSURE SUPPLY SYSTEM
Stanley R. Tyler, Cheltenham, England, assignor to Dowty Fuel Systems Limited, Cheltenham, England
Filed June 13, 1961, Ser. No. 116,824
Claims priority, application Great Britain June 15, 1960
5 Claims. (Cl. 103—97)

This invention relates to a pressure liquid supply system employing a centrifugal pump. The aim of the invention is to provide improved means for shutting off the delivery of a centrifugal pump whilst the pump is still driven in such a way as to cause little power dissipation at the pump.

In accordance with the present invention a centrifugal pump includes a shut off valve in series with the liquid flow passage into the pump. Closure of the shut-off valve whilst the pump is being driven will enable the pump to empty itself so that the pump rotor may rotate without substantial resistance. A further shut-off valve may be provided in series with liquid flow entering the pump to provide alternative control. A vent valve in the pump delivery connection may be arranged to vent pump delivery to low pressure simultaneously with closure of a shut-off valve. The centrifugal pump may be arranged to operate in the manner disclosed in our co-pending patent application No. 676,637 now abandoned in which a controlled liquid flow to the inlet of the pump causes a hollow core or cavity at vapour pressure to be developed within the liquid in the pump impeller. In this case one shut-off valve may also form a scheduling valve for control of inlet flow into the pump.

The invention is particularly applicable for the delivery of fuel to the after burners of a gas turbine engine in order that the centrifugal pump may be mechanically driven from the engine and yet still permit shutting off of fuel flow control to the after burners.

Two examples of the invention as applied to the supply of fuel to the after burners of an aircraft gas turbine engine will now be described with reference to the accompanying drawings in which, FIGURE 1 is a diagrammatic representation of one example and FIGURE 2 is a diagrammatic representation of the other example.

Reference is made initially to FIGURE 1 in which a shaft 1 mounted in a housing 2 is rotatably driven by a gas turbine engine (not shown) having a normal fuel system (not shown). The drive shaft 1 drives a shrouded pump impeller 3 within a casing 4. The rotor 3 and casing 4 in fact form the centrifugal pump. The inlet 5 of the centrifugal pump permits entry of fuel in between a valve seating 6 and mushroom valve head 7 into the impeller 3, from a low pressure source 10 and pump delivery is obtained from the volute 8 within the casing to the delivery passage 9. The low pressure source may conveniently be the fuel tank and boost pump on the aircraft.

For control of the valve head 7 a valve stem 11 extends to a servo piston 12 mounted for sliding movement in a cylinder 13. The end of the cylinder 13 nearer to the valve head 7 is fed with fuel at constant pressure from a constant pressure valve 14 through pipe 15. The constant pressure valve 14 obtains pressurised fuel at a higher pressure than the constant pressure, from the normal fuel system of the gas turbine engine through pipe 16. A restrictor 17 interconnects the two ends of cylinder 13 and a further pipe 18 extends from the end of the cylinder 13 remote from valve 7 to a vent 19 from which leakage is permitted by a half ball valve 21. The half ball valve 21 is controlled by the movement of a pivoted lever 22 within a chamber 23 as the result of opposed forces due to a compression spring 24 and a push rod 25. The push rod 25 has force applied to it by a flexible diaphragm 26 responsive to the difference of fluid pressures in chambers 27 and 28. The source of pressures in chambers 27 and 28 will be described later in the specification. Around the stem 11 of the valve 7, a compression spring 29 is located whose function is to urge valve head 7 away from seating 6.

Fuel at a comparatively low pressure from the aircraft fuel tank is fed through a pipe 31 to a servo controlled shut-off valve 32 from which it passes to the inlet 5 of the centrifugal pump. Shut-off valve 32 comprises an annular seating 33 with which co-operates a valve member 34 carried by a diaphragm 35. Around the outside of the annular seat 33 and annular chamber 36 is formed in which low pressure from pipe 31 may act on diaphragm 35. On the opposite side of the diaphragm 35 an enclosed chamber 37 is formed within which a spring 38 is provided which normally acts to urge valve member 34 against annular seating 33. A pipe 39 extends from the chamber 38 to a servo operated dump valve 40. Within this dump valve the pipe 39 may either be connected to a pipe 41 which extends from the inlet 5 at a position downstream of the valve seat 33 or alternatively it may be completely closed. A restrictor 42 extends between the fuel supply pipe 31 and the chamber 37. Thus when pipe 41 is connected to pipe 39 the pressure in chamber 37 is equal to that downstream of the seat 33. The upward pressure of inlet fuel from pipe 31 on the diaphragm 35 will then act to hold the valve member 34 off seat 33 permitting flow of liquid with slight pressure drop at the seat 33 into the inlet 5. When pipe 39 is closed pressure in space 37 will rise to the same value as pressure in pipe 31 with the result that the spring 38 will urge the valve member 34 onto its seat to shut-off flow of fuel into the inlet 5. The valve 32 forms the shut-off valve in series with the inlet flow to the centrifugal pump.

In order to control delivery flow rate of fuel from the centrifugal pump the delivery 9 thereof is passed through an adjustable throttle aperture 43 in cylinder 44 within which a piston valve 45 is slidable, having a land 46 for varying the effective size of the aperture 43. A discharge port 47 carries liquid from cylinder 44 to the afterburners of the engine. The piston valve 45 is adjusted by means of a servo piston 48 slidably mounted within cylinder 49. The upper end of cylinder 49 is fed with fuel at constant pressure from the pipe 15 and a restrictor 51 interconnects the upper and lower end of the cylinder 49. A vent pipe 52 extends from the lower end of the cylinder 49 to a vent 53 controlled by half ball valve 54. The half ball valve is carried by a pivoted lever 55 whose position is adjusted by means of a pair of opposed bellows 56 and 57. The bellows 56 and 57 are fed by gas pressures obtained from stages within the gas turbine engine. The actual sources of these pressures does not concern the present invention except to say that they form a suitable automatic control means for determining fuel flow to the after burners. They exert a force on the lever 55 which is opposed by a feed back spring 58 extending from piston valve 45. In effect its operation is to ensure adjustment of the piston valve 45 to a position proportional to the resultant force exerted by bellows 56 and 57 on lever 55. The position of piston valve 45 will, therefore, determine the effective opening of the throttle aperture 43.

Flow of fuel delivered by the centrifugal pump through the aperture 43 will produce a pressure drop at this aperture which is fed through pipes 59 and 61 respectively to the chambers 27 and 28 so that a force is exerted on diaphragm 26 proportional to pressure drop at the aperture 43.

The pump delivery at pipe 9 may be by-passed to low pressure by means of the dump valve 40 and for this purpose the pipe 61 is connected to the dump valve. The dump valve 40 comprises a cylinder 62 within which a piston valve member 63 is slidable by means of a servo piston 64 carried within a servo cylinder 65. The servo piston 64 is operated by pressure fuel delivered through pipe 16 from the normal fuel system of the gas turbine engine. This pressurised fuel is delivered to the lower end of cylinder 65 to operate on an annular area of piston 64 represented by the difference between piston 64 and piston valve 63. Fuel from pipe 16 is fed through restrictor 66 to the upper end of cylinder 65 where it acts substantially over the whole area of piston 64. A spring 67 is also provided in the upper end of cylinder 65 to urge piston 64 downwardly. A stop 68 limits upward movement of piston 64 whilst the lower end of cylinder 65 forms the lower stop for piston 64. Pressure in the upper end of cylinder 65 is controlled by an electrically operated valve 69 operable at will be the aircraft pilot.

Within the cylinder of the dump valve 40 four ports are formed respectively numbered 71, 72, 73, and 74. Two lands 75 and 76 of piston valve 63 control flow of liquid between ports 71 and 72 which are respectively connected to pipes 39 and 41 so that in the uppermost position of servo piston 64 flow is established between pipes 39 and 41 and in the lower position flow is cut off. Port 73 and the lower end of cylinder 62 are connected to atmosphere whilst the port 74 is connected to the pipe 61. In the lower end of the piston valve 63 a passage 77 is formed whose function is to connect the space between lands 76 and 78 to atmosphere through pipe 79. In the position as shown the land 76 closes port 73 and land 78 closes port 74. In the other position of the servo piston 64, land 75 will close port 71 and lands 76 and 78 will move from their ports 73 and 74 thus causing ports 72 and 74 to be connected to atmosphere.

For normal operation of this fuel system when after burning fuel is required the valve 69 is opened to connect constant pressure from valve 14 to the upper end of cylinder 65 whereby piston 64 is moved to its uppermost position as shown. This will cause connection of pipes 39 and 41 to one another whereby shut-off valve 34 is opened. It will also cause port 74 to be closed so that fuel delivered through pipe 9 must pass through aperture 43 to the after burners of the engine. The pressure drop occurring at aperture 43 will adjust the force acting on diaphragm 26 which is turn adjusts vented fuel from vent 19 to cause appropriate movement of servo piston 12 which in turn will control inlet flow into the centrifugal pump. Within the centrifugal pump a core will appear in the fuel at vapour pressure so that the radial depth of fuel remaining will determine the actual pressure given to the delivery to ensure that the desired rate of flow occurs. A fuel scheduling control is thus formed in which the action of spring 24 opposing the force on diaphragm 26 ensures a constant pressure drop at the aperture 43 by so adjusting servo piston 12 to control fuel flow into the pump so that the actual delivery rate through the aperture 43 causes the required pressure drop. When after burning fuel is not required the pilot operates valve 69 to close it so that fuel at the upper end of cylinder 65 assumes the pressure in pipe 16 thus urging piston 64 downwardly to its lowermost extent. In this position port 71 is closed and port 72 is vented to atmosphere through port 73. This in turn will cause the valve member 34 of the shut off valve 32 to close and the inlet 5 to the pump will be vented through pipe 41 to the atmosphere. At the same time the opening of port 74 to atmosphere will vent fuel delivered at pipe 9 to the atmosphere. Thus it will be seen that fuel inlet into the pump is shut off by the valve 32 and any fuel delivered by the pump is vented to atmosphere through the dump valve 41. Thus the centrifugal pump will be completely emptied so that the pump may continue to run without delivery of fuel and without any substantial generation of heat. The land 78 incorporated with the port 74 forms the vent valve which vents delivery from the centrifugal pump to the atmosphere.

Reference is now made to FIGURE 2 of the accompanying drawings. The fuel system shown in this drawing is also intended for the supply of fuel to the after burners of a gas turbine engine, with the difference that this arrangement showns means by which the pilot can vary the scheduled after burner flow. A mechanically driven shaft 81 connected to the engine acts to rotate a shrouded centrifugal pump rotor 82 within a housing 83 having volute 84 from which delivery passes to delivery pipe 85. Fuel enters the centrifugal pump from a low pressure source 90 through pipe 86 between a valve seating 87 and a mushroom valve head 88 which in this instance is capable of being engaged upon seating 87 to form a shut-off valve in addition to being an adjustable throttle valve. As in the previous example the low pressure source 90 may be the aircraft fuel tank and boost pump. A stem 89 extends from the mushroom head 88 to a servo piston 91 slidably mounted within servo cylinder 92. For servo operation of piston 91 a supply of filtered pressurised fuel is taken from the normal engine fuel system through pipe 93 and is fed directly to the right hand end of cylinder 92. Fuel may flow through orifice 94 in the piston 91 to the left hand end of cylinder 92. Tapered needle 91a fixed axially of the cylinder reduces the orifice 94 as the piston moves to the left. A venting pipe 95 extends from the left hand end of cylinder 92 for connection to a solenoid valve 96 for venting to low pressure and for connection to a control valve 97 also for venting to low pressure. Low pressure fuel before entering the inlet pipe 86 passes from a pipe 98 through a shut-off valve 99. The shut-off valve 99 comprises a piston type of valve controlled by a rack 101 and pinion 102. A drive shaft 103 shown in dotted lines, extends from pinion 102 to a further rack and pinion operated control valve 104 and to the main control of the normal fuel system which is not shown.

Delivery from the centrifugal pump passes through pipe 85 and a spring loaded valve 105 to a pipe 106. In parallel with the valve 105 is a by-pass valve 107 comprising a valve member 108 held on to its seating by means of a piston 109 of which the side opposite the valve 108 is exposed to pressure on the downstream side of valve 105. Pressure on the upstream side of valve 105 acts over the seating of the valve member 108 in opposition to the pressure on piston 109. A spring 111 is also provided to tend to urge valve member 108 in the opening direction. When valve 108 opens the pump delivery from pipe 85 is connected to drain through a pipe 112. It will be seen that if the delivery pressure from the centrifugal pump falls below a certain value that the valve 105 will close and the pressure on the downstream side in pipe 106 will fall to a low value sufficient to remove the closing force applied to valve member 108 by piston 109. The valve 108 will, therefore, open and vent to low pressure will be provided through pipe 112.

For the purpose of controlling fuel flow delivered by the centrifugal pump a metering valve 113 is provided. This valve 113 comprises a cylinder 114 within which a piston member 115 is slidably mounted leaving working spaces 116 and 117 at opposite ends. Within the space 117 a spring 118 is provided to urge the piston 115 toward the space 116. The pipe 116 from valve 105 enters the cylinder 114 at port 119 into a waisted part 121 of piston 115. Fuel leaves through a throttle aperture 122 whose effective area is controlled by the position of land 123 of piston 125. From the port 122 fuel enters a pipe 124 from whence it passes to the after burners 140 of the engine. Pipes 125 and 126 connected respectively to ports 119 and 122 measure the pressure drop at the variable aperture formed by port 122 and connected to a control valve 127 for opposed operation on a piston 128 slidable within a cylinder 129. A waisted portion 131 of piston 128 will open or close a port 132 extending from pipe 95 to connect it to low pressure through a pipe 133. The pressures in the spaces 116 and 117 of metering valve 113 are obtained from the gas turbine engine. To the space 117 a pipe 134 feeds the jet nozzle pressure. From pipe 134 a fixed restrictor 135 is connected in series with a variable throttle valve 104 which extends through pipe 136 to the engine compressor output pressure. The pipe 137 interconnecting throttle 104 with restrictor 135 is also connected to the space 116. The operation of the throttle valve 104 controls the effective pressure in space 116 but of course it will vary in dependence on engine operation. The resultant force on the piston 115 compresses spring 118 to a variable extent to determine the opening of the throttle aperture 122. The throttle valve 104 is controlled by a rack 138 and pinion 139, the pinion being mechanically connected to the pinion 102 and also to the fuel flow control of the main fuel system of the engine.

Operation of the after burner fuel system as described is, therefore, controlled during control of the normal fuel system of the engine, and initially the pilot is permitted to select fuel flow to the after burners or not by operation of the solenoid valve 96. If the solenoid valve is energised to cause the valve to open to bleed fuel from pipe 95 it will be seen that the pressure at the lefthand end of cylinder 92 is reduced to a low value and it will cause the servo piston 91 to close mushroom valve 88 onto its seat 87 thus to prevent entry of fuel into the centrifugal pump. Any fuel contained within the pump will not be able to generate any substantial pressure so that the valve 107 will open and fuel within the pump will be communicated to low pressure. The mushroom valve 88 together with its seat 87 will, therefore, form a shut-off valve in the inlet. In the event that the pilot requires after burner fuel the solenoid valve 96 is de-energised. Movement of the main engine control beyond the idling position will at the minimum after burner fuel flow permit the shut-off valve 99 to open to permit flow of fuel from pipe 98 into the inlet 86 of the centrifugal pump. In raising the engine speed from the idling value it is necessary to ensure that valve 107 is closed. For this purpose a check valve 141 located in fuel delivery pipe 124 acts to ensure that when fuel is delivered a minimum pressure equal to its spring loading must exist on its upstream side. Such minimum pressure is arranged to be capable of acting on piston 109 to hold valve member 108 on its seat. To ensure that this minimum pressure is not trapped by valve 141 after fuel shut off a restrictor 142 extends from pipe 124 to low pressure. As engine speed is increased beyond the minimum reheat position the port 122 of the metering valve will increase in size permitting greater delivery through pipe 124 to the engine. The mushroom valve member 88 in co-operation with the seat 87 will then form a variable throttle of fuel entering the centrifugal pump to schedule the actual fuel flow to the engine. This schedule of fuel flow is determined by the effective aperture permitted at throttle 122 and the fact that the control valve 127 acts to tend to maintain a constant pressure drop at the valve 122 by its control of vented fuel from the port 132 which in turn will determine the position of servo piston 91 and thus of the mushroom valve member 88. Stable control of piston 91 is attained by the provision of needle 90 which ensures that the position of piston 91 is in proportion to leakage flow through pipe 95. As engine speed increases so the port 122 will increase in size permitting more and more fuel flow to the after burners up to the maximum re-heat position.

In this fuel system it will, therefore, be seen that there are two shut-off valves formed by the valve 99 and the mushroom valve member 88 in series with the inlet to the centrifugal pump, either of which may shut off fuel into the centrifugal pump. Also it will be seen that a vent valve 107 is provided to vent the centrifugal pump delivery to low pressure when the delivery pressure falls below a predetermined value. In this way by alternative use of the valves as described the flow of fuel from the centrifugal pump may be shut off when desired whilst the pump itself may continue to be driven.

In either of the described examples after burner fuel flow may be controlled other than in dependence on engine operating conditions. In FIGURE 1 independent control could be exerted by direct manual control of half ball valve 54 whilst in FIGURE 2 direct manual control could be exerted on piston 115. In FIGURE 2 for convenience pistons 115 and 128 have been shown for direct operation by their controlling pressures. For accurate control of these pistons it would be desirable either to supply them with a rotational drive to reduce friction or to operate them by servo motors.

I claim as my invention:

1. In combination, a source of liquid, a centrifugal pump having an inlet and an outlet, conduit means defining a first liquid flow passage interconnecting the liquid source with the pump inlet, a second liquid flow passage connected with the pump outlet, and a liquid vent interconnecting the second liquid flow passage with a low pressure zone, a first shut-off valve operative to control the liquid supply through the first flow passage, a second shut-off valve operative to control the liquid discharge through the vent, and manually-operated control means operative to open and close the first shut-off valve, the second shut-off valve being responsive to the closing of the first shut-off valve to open the vent, and conversely, to close the vent upon the opening of the first shut-off valve.

2. The combination according to claim 1 wherein the first shut-off valve includes a pressure responsive closure member, and the control means includes a manually-operated control valve for varying the pressure differential across the closure member, the second shut-off valve being responsive to the operation of the control valve.

3. The combination according to claim 1 wherein the second shut-off valve includes a closure member which is responsive to the pressure in the second flow passage.

4. The combination according to claim 3 further comprising a spring loaded check valve disposed in the second flow passage, the closure member being responsive to the pressure in the second flow passage on the downstream side of the check valve.

5. The combination according to claim 1 further comprising second manually-operated control means operative to throttle the first shut-off valve opening for purposes of scheduling the liquid supply through the first flow passage.

References Cited in the file of this patent

UNITED STATES PATENTS

| | | |
|---|---|---|
| 1,482,376 | Anderson | Feb. 5, 1924 |
| 1,616,992 | Ruckstal | Feb. 8, 1927 |
| 2,189,162 | Buck | Feb. 6, 1940 |
| 2,860,485 | Lindsey | Nov. 18, 1958 |
| 2,997,227 | Ternent | Aug. 22, 1961 |

FOREIGN PATENTS

| | | |
|---|---|---|
| 744,317 | Great Britain | Feb. 1, 1956 |
| 822,084 | Great Britain | Oct. 21, 1959 |